March 29, 1960  C. A. BARRETT ET AL  2,930,398
HIGH CAPACITY COMBINATION REGULATOR AND CHECK VALVE
Filed Oct. 24, 1955  2 Sheets-Sheet 1
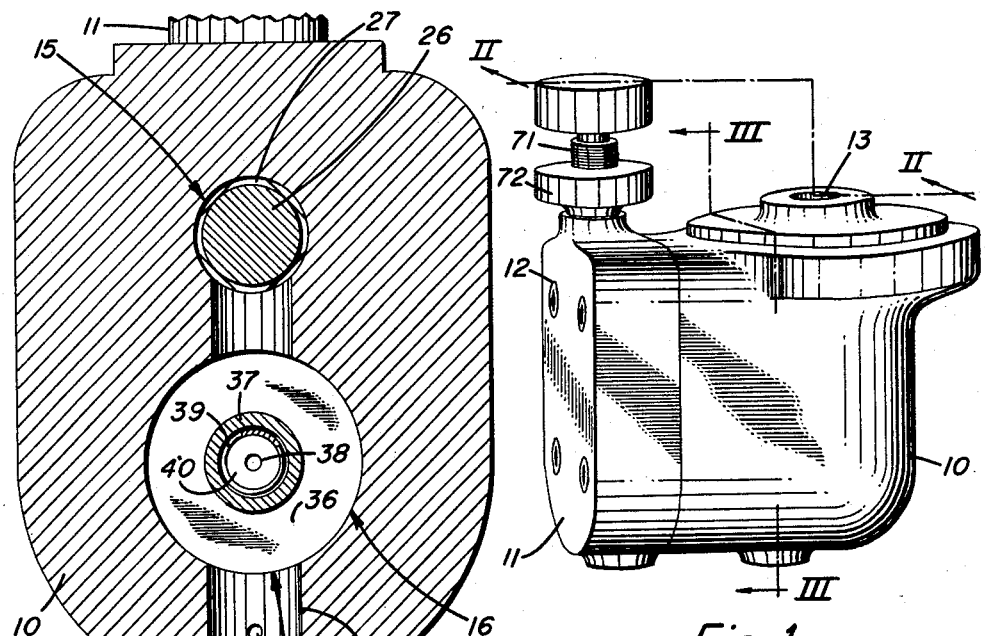
Fig. 1
Fig. 3
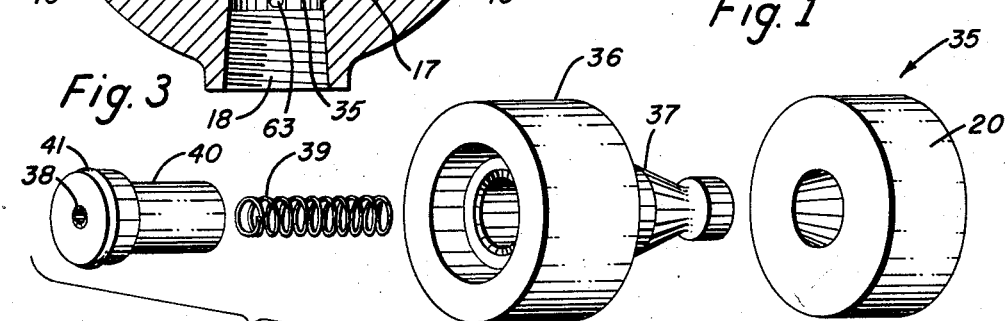
Fig. 4
Fig. 5
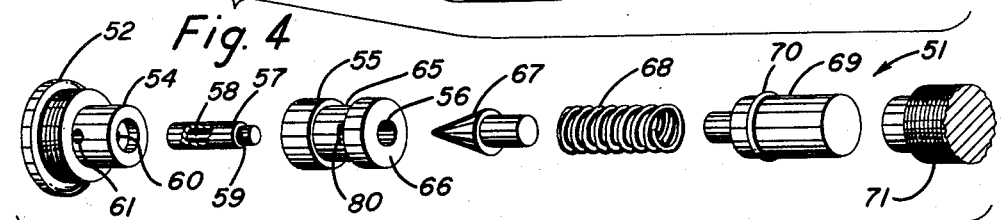
Fig. 6
INVENTORS
Cedric A. Barrett
John P. Kingsbury
BY *Peter P. Price*
ATTORNEY

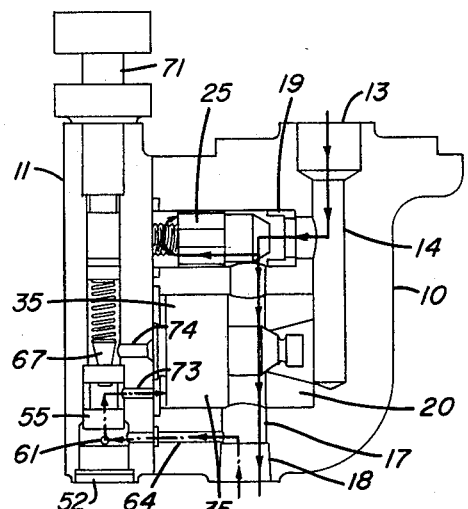
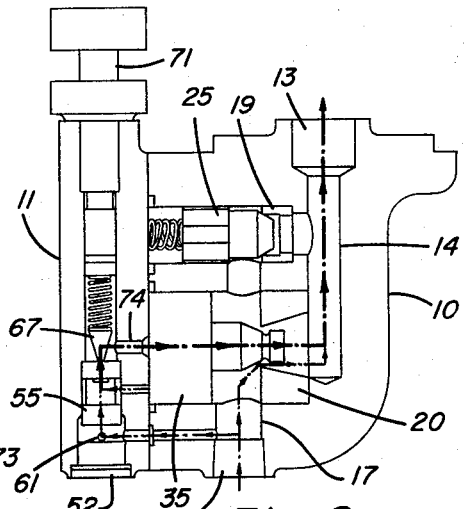
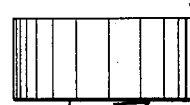
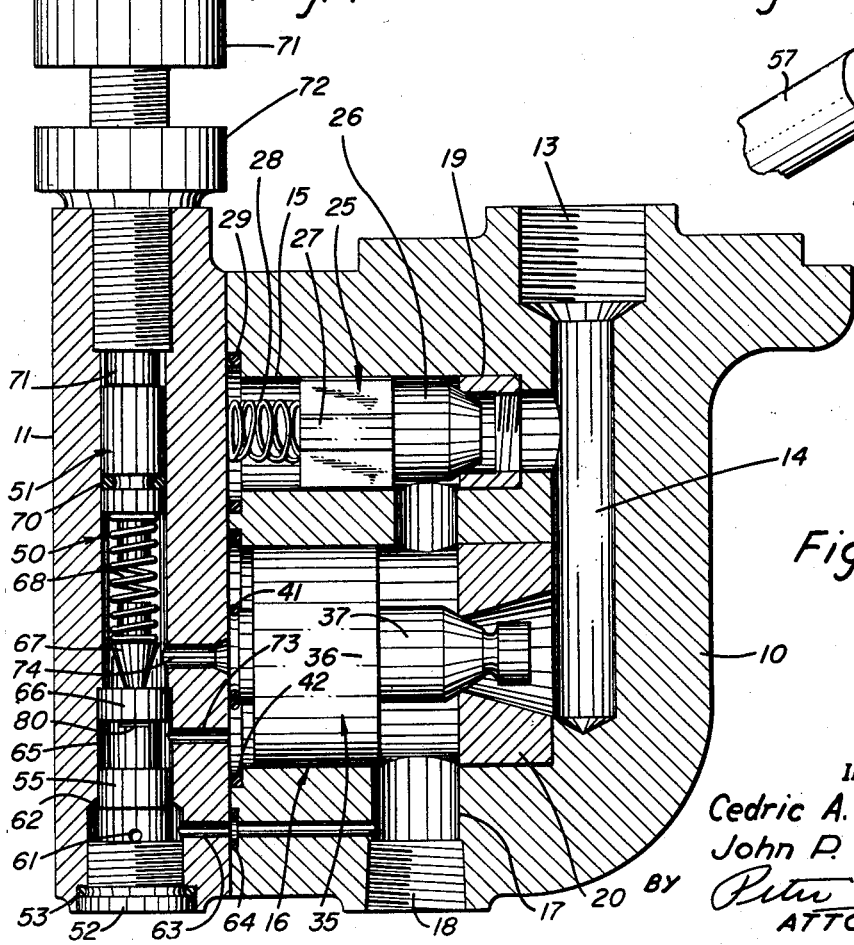

United States Patent Office 2,930,398
Patented Mar. 29, 1960

2,930,398

HIGH CAPACITY COMBINATION REGULATOR AND CHECK VALVE

Cedric A. Barrett and John P. Kingsbury, Grand Rapids, Mich., assignors to Grand Valley Machine and Tool Company, Grand Rapids, Mich., a corporation of Michigan Application October 24, 1955, Serial No. 542,446

2 Claims. (Cl. 137—489)

This invention relates to hydraulic valves and more particularly to a combination pressure regulating valve and a check valve with high flow capacity.

This valve is particularly designed for use with equipment requiring a valve to repeatedly pass large volume surge loads of hydraulic fluid. It is also designed for equipment operating through many complete cycles per minute, and requiring the valve to execute all its functions during each cycle of operation.

While valves of this general nature have been known heretofore, this valve incorporates several improvements not available in presently known valves. It provides a single unit in which is incorporated a pressure regulating valve, a relief valve and a check valve. By this arrangement the fluid may flow rapidly in both directions with its return regulated by the pressure regulating valve. The valve also provides an arrangement in which large quantities may flow from a source to an area of demand, thus eliminating the delay heretofore resulting from the lack of capacity of existing valve structures.

This invention provides a compact valve structure which may be serviced as a single unit either by way of repair or by replacement.

These and other objects and purposes of this invention will be understood by those acquainted with the design and application of hydraulic equipment upon reading the following specification and the accompanying drawings.

In the drawings:

Fig. 1 is an oblique elevation view of the valve.

Fig. 2 is a central, sectional view taken along the plane II—II of Fig. 1.

Fig. 3 is a sectional elevation view taken along the plane III—III of Fig. 1.

Fig. 4 is an exploded, oblique view of the return valve of the assembly.

Fig. 5 is an exploded, oblique view of the pressure regulating valve.

Fig. 6 is a fragmentary, central, sectional view of the return valve.

Fig. 7 is a somewhat schematic, sectional, elevation view showing the flow pattern of the hydraulic fluid when the valve assembly is passing fluid from the source to the zone of demand.

Fig. 8 is a somewhat diagrammatic, sectional, elevation view showing the path of travel of the fluid when the fluid is being returned under pressure from the demand zone to the source.

Fig. 9 is a fragmentary, enlarged, oblique view of the inner end of the plunger in the pressure regulating chamber.

This invention provides a valve assembly in which both a return valve and a check valve communicate with a common supply conduit. Only the check valve opens to permit flow of hydraulic fluid from source to the zone of demand. The return valve remains closed at all times during fluid flow from source to demand. When the pressure relationships on both the supply and demand side are substantially in equilibrium, the check valve is biased closed. As the pressure builds up in the demand zone, return of the hydraulic fluid is prevented from occurring through the return or check valves. When a predetermined pressure has been attained, the pressure regulating valve opens to permit fluid to return through the center of the return valve to the original source and thereby maintain the pressure on the demand side at a suitable fixed value. The opening of the pressure regulating valve upsets the balance of forces biasing the return valve closed and it opens to permit rapid return of large quantities of fluid. Thus, this valve assembly permits the rapid flow of large quantities of hydraulic fluid in both directions, greatly reducing the time element in each operational cycle of the equipment on the demand side. Yet it is capable of maintaining accurate pressure values on the demand side of the valve assembly.

Referring specifically to the drawings, the numeral 10 refers to a main housing to one end of which is detachably secured by screws 12 an auxiliary housing 11. The housing 10 has an internally threaded inlet port 13 by which the valve assembly is operatively connected to a suitable supply of hydraulic fluid under pressure such as a surge tank, an accumulator or a hydraulic supply line. The fluid source utilized with this valve must be of such a nature that it permits the hydraulic fluid to flow in both directions.

A supply passage 14 extends into the housing from the inlet port 13 (Fig. 2). The supply passage communicates with a pair of parallel chambers, these being the check valve chamber 15 and the relief valve chamber 16. A receiving passage 17 also communicates with both valve chambers. The receiving passage is parallel to the supply passage and has a threaded discharge port 18 on one end. Between the receiving passage 17 and the supply passage 14, the check valve chamber 15 has a shoulder providing a stop for the valve seat 19. In a similar manner, between these passages, the relief valve chamber has a shoulder forming a stop for the relief valve seat 20.

The check valve assembly 25 includes the check valve spool 26 which, on the end adjacent the valve seat 19, is of frusto-conical shape. The other end of the valve spool 26 is enlarged to the size of the chamber 15 by means of flutes 27 (Fig. 3). The channels between the flutes 27 permit the hydraulic fluid to pass behind the valve spool 26 and thus exert a closing pressure upon the back face of the valve spool.

The spool 26 is biased toward the seat 19 by a spring 28, one end of which seats against the face of the auxiliary housing 11. This spring exerts a relatively light pressure, thus, its biasing effect does not become effective until the hydraulic forces around it are substantially in balance. Where the chamber 15 opens through the end of the housing 10, the chamber is surrounded by an O-ring type seal 29 providing a fluid tight seal at this point.

The end of the spool 26 extending from the flutes 27 into the seat 19 is of lesser diameter than the chamber 15, thus providing an annular passage for the flow of oil in the channels between the flutes 27 and to the receiving passage 17. The receiving passage 17 communicates with the chamber 15 between the fluted portion of the spool and the seat 19.

The relief valve assembly 35 is best seen in Figs. 4 and 6. The relief valve assembly 35 consists of a valve body 36 having a valve stem 37 projecting from one end. Both the valve body 36 and the stem 37 are hollow, having a central chamber forming the return passage 38. The valve stem 37 has, for a portion of its length, a cone shaped area designed to seat against the valve seat 20 and to form a seal therewith. The central chamber of the valve body has a double stepped portion forming a pair of internal shoulders. One of these shoulders provides a seat for the end of the spring 39. This spring biases the valve against the seat 20. The spring 39 is seated in the return passage 38 with its other end bearing against a shoulder in the end of the spindle 40 adjacent the auxiliary housing 11. A major portion of the spring is surrounded by the annular apron of the spindle 40. The passage within the valve body 36 is longer than the spindle 40, permitting axial reciprocation of the valve about the spindle.

The end of the spindle 40 adjacent the auxiliary housing 11 is flanged outwardly and surrounded by an O-ring type sealing gasket 41. The gasket 41 seats against the auxiliary housing 11 to provide a hydraulic fluid tight seal therewith. The return passage 38 extends through the center of the spindle 40, providing communication between the interior of the valve assembly 35 and the chamber for the regulator valve assembly.

The portion of the return valve chamber 16 adjacent the auxiliary housing 11 and behind the relief valve 35 constitutes a pressure chamber. It is connected to the receiving passage 17 and when the pressure regulating valve 51 is closed, its pressure is the same as that of the receiving passage 17.

The valve body 36 is of substantially greater diameter than the spindle 40, thus providing a large, rear surface against which hydraulic fluid may exert a biasing pressure in the same direction as the spring 39. In a similar manner, at the forward end, the substantial differential in diameters between the stem 37 and the main body portion of the valve provides a similarly large area against which pressure may be exerted by the hydraulic fluid to urge the valve into open position. The relative functions of these surfaces will be explained more fully under "Operation." The receiving passage 17 communicates with the valve chamber 16 between the valve seat 20 and the enlarged portion of the valve 36.

The relief valve chamber 16 opens through the face of the housing 10 abutting the auxiliary housing 11. At this point an O-ring type seal 42 is provided to assure a liquid tight seal at the joint between the two housings.

The auxiliary housing 11 has an elongated central chamber 50 containing the pressure regulator valve assembly 51 (Fig. 2). The pressure regulator valve assembly 51 is best seen in Figs. 2 and 5. The central chamber 50 parallels the supply passage 14 and receiving passage 17. At its end adjacent the discharge port 18, the central chamber is internally threaded to receive the terminal gland 52. The terminal gland 52 has a widely flanged end portion adjacent which is a sealing ring 53. The sealing ring 53 seats against a suitable shoulder in the central passage. The inner portion of the terminal gland 52 consists of a collar 54 of reduced diameter designed to abut against the end flange of the casing 55. The end flange of the casing is of such diameter that it provides a fluid tight fit with the walls of the central chamber 50.

The casing 55 is hollow creating a central channel 56 within which is seated a plunger 57 having a sufficiently free fit that it may reciprocate axially of the casing. The plunger 57 is itself hollow having a central oil channel 58 opening through the end toward the terminal gland 52 and adjacent its opposite end through a pair of laterally extending side ports 59. The inner end of the terminal gland collar 54 has an opening to receive the outer end of the plunger 57, which opening communicates through a hole 60 with a pair of side ports 61 extending diametrically through the collar immediately adjacent the threaded shoulder of the terminal gland.

In the area of the collar 54 the chamber 50 is of enlarged diameter providing an annular channel 62. The annular channel 62 communicates with the receiving passage 17 by means of the conduit 63. The conduit 63 extends through both the main housing 10 and the auxiliary housing 11. At the joint between the housings, leakage is prevented by an O-type sealing ring 64. The inner end of the plunger 57, including the area where the diametrical discharge ports 59 are located, is of reduced diameter. The extreme end of the plunger 57 is flat.

The inner end of the casing 55 is reduced diameter and has diametrically extending side ports 80 communicating both with the central passageway in the casing and with the annular chamber 65 created by the reduced diameter of the inner end of the casing.

A ring 66 having a central opening forming an extension of the central passageway 56 is pressed tightly against the inner end of the casing 55.

The ring 66 is of such diameter that it forms a press fit with the walls of the chamber 50. Its axial position along the passage is determined by a shoulder in the wall of the chamber 50. The inner end of the opening 56 constitutes a valve seat for the conical valve 67 and is itself a receiving port for the chamber in which the pressure regulating valve is located. One end of the conical valve is of reduced diameter to provide a stud. The stud serves as a seat and guide for the compression spring 68.

The other of the spring ends seats about a stud projecting from the rod 69. The rod 69 seats slidably within the central chamber 50 and is equipped with an annular groove seating the sealing ring 70. The sealing ring 70 cooperates with the walls of the central chamber 50 to provide a liquid tight seal.

The end of the rod remote from the spring 68 bears against the inner end of the adjustment screw 71. The adjustment screw has a head on its outer end to permit manual adjustment. The adjustment screw is externally threaded and engages the internal threading at the end of the chamber 50 opposite from the terminal gland 52. The axial position of the adjustment screw 71 is locked by a threaded locking ring 72.

The annular oil passage 65 between the flanged end of the casing 55 and the ring 66 is connected to the relief valve chamber 16 behind the return valve by means of the orifice 73. The orifice 73 provides fluid access to the rear of the relief valve 35, permitting the fluid to bias the valve toward the seat 20. A second passage 74 connects the chamber 50, inwardly of the conical valve 67, and the central opening 38 in the main supply valve 35. This provides the path for hydraulic fluid return from the demand zone to the supply zone when the pressure regulating valve opens.

*Operation*

When the valve is inactive, the various components are in the position indicated in Fig. 2, that is, all valves are biased to closed position. In the particular use for which this valve was designed, the valve is employed as the control unit between a surge tank serving as a source of supply of hydraulic fluid and a hydraulically cushioned and positioned die which operates as the demand element for the valve. This type of die unit and its operation is described in copending application Serial No. 497,127, filed March 28, 1955, entitled Die Assembly for Converting Momentum Presses for Hydraulic Operation. The supply or surge tank is suitably connected to the inlet port 13 and the die unit is suitably connected to the discharge port 18.

Before the die is operated, the pressure regulating valve, by manipulation of the adjustment screw 71, is adjusted to provide the correct pressure upon the spring 68 which will result in the valve's opening when the desired maximum pressure has been reached. As a typical example of the valve's operation, the hydraulic fluid in the supply tank and thus in the supply passage 14 may be maintained at 90 lbs. per square inch. This value is merely illustrative and not limiting. The regulator valve may be set to open at 5,000 lbs. per square inch. When the die is first connected, there will be no pressure in its hydraulic passageways. Accordingly, the 90 p.s.i. applied to the hydraulic fluid in the supply passage 14 will overcome the bias of the spring 28, opening the check valve. Hydraulic fluid will then flow rapidly into the receiving passage 17 and thus to the die. Because of the size of the check valve and the light biasing action of the spring 28, the check valve will offer little resistance to the flow of the hydraulic fluid. This permits the valve assembly to pass quickly a large volume of fluid to the die or demand zone.

When the die unit has received all the oil necessary to fill its passages and fully extend all movable pistons actuated by the hydraulic fluid, the balance of forces within the valve will cause the check valve 25 to close under the urging of spring 28. This closing action is accelerated by the fact that the hydraulic fluid has access to the rear or back surface of this valve, thus causing the hydraulic forces operating on both ends of this valve to substantially neutralize each other.

When the check valve is open, the hydraulic forces acting upon the valve will be neutral because identical surface areas are exposed to the fluid at both ends. Thus, all closing bias results from the spring 28. However, once this valve has closed and the pressure rises in the receiving passage 17, this balance ceases. That surface area of the check valve extending into the seat 19 will be exposed to a lower pressure, leaving a net of hydraulic forces urging the valve closed. The net hydraulic forces acting in a closing direction on the check valve 25 will be the difference in pressure times the area of the back surface of the valve and the area of the valve at its point of contact with the seat 19. The hydraulic fluid reaches the back face of the check valve by passing between the flutes 27 of the check valve. The hydraulic fluid is admitted to the back face of the relief valve 35 by passing through the passageway 63, orifices 61 and then through the inner channel 58 of the plunger 57. From this passage, it discharges through the ports 59 and through the ports 80 in the casing 55 into the passage 73. This constitutes the first conduit. The flow of the oil, when the valve is open to supply hydraulic fluid to the die unit, is schematically indicated in the flow diagram of Fig. 7. It will be noted that when the pressure on the supply side exceeds that on the demand side the large surface of the check valve exposed to the supply side will cause it to open. The spring 39 biasing the relief valve 35 closed is substantially stronger than the spring 28 acting on the check valve 25. Because the check valve is designed for high flow capacity, the relief valve will not be caused to open.

The outside diameter of the spindle 40 is less than the diameter of the return valve at its point of contact with the valve seat 20. Thus, the hydraulic forces acting on the back surface are greater than those acting on the surface exposed to the receiving passage 17. These forces, acting in conjunction with the spring 39 tend to dampen the movements of the relief valve and prevent it from chattering.

Both the check and relief valves will remain closed until the pressure regulating valve 51 opens. When the pressure reaches the value at which the pressure regulating valve is set, it opens as a result of the plunger 57 forcing the conical valve 67 against the spring 68.

When this happens, hydraulic fluid may freely flow into the second passage 74 and escape to the supply passage 14 through the return passage 38 in the relief valve assembly 35. The return passage 38 constitutes the third conduit. The side ports 80 in the end of the casing 65 are substantially larger than the discharge ports 59 in the end of the plunger 57. The reduced diameter of the end of the plunger 57 provides a second conduit and thereby access for hydraulic fluid entering through the side ports 80 to pass through the collar 66.

The capacity of the discharge ports 59 in the end of the plunger 57 is substantially less than that of the valve 67 when it is open. Thus, these ports 59 actually constitute a flow restrictor element. As a result, hydraulic fluid will flow rapidly from the pressure chamber portion of the chamber 16 behind the relief valve 35. This will upset the balance of forces acting upon the relief valve 35, causing it to open because of the high pressures existing in the receiving passage 17. The relief valve 35 is capable of passing substantially greater volumes of hydraulic fluid than is possible with any pressure regulating valve.

Because the discharge ports 59 in the plunger 57 act as a highly restricted metering valve, the pressure regulating valve 51 will remain open until the relief valve 35 has discharged sufficient fluid to reestablish the pre-set pressure valves. In the downward stroke of a press opening up to 200 strokes per minute, the return of the fluid to source will be so rapid and in such volume that the relief valve 35, once open, will remain open substantially to the end of the downward stroke of the press.

Further, once the pressure regulating valve assembly 51 opens, the pressure in the casing 65 and collar 66 acting to close the valve will drop, thus, the higher pressures acting on the plunger 57 to keep it open will result in a greater net force acting to maintain the valve open.

This valve is designed for a use with dies which may operate up to 200 cycles per minute. Each cycle requires a substantial quantity of hydraulic fluid to be exhausted from the die and then returned to it, each almost instantaneously to the die as the press closes and then opens. Almost as soon as the die's fluid demand is satisfied, the press starts its downward stroke with all of the valves of the valve assembly closed. The downward stroke of the press brings pressure to bear on the movable elements of the die, resulting in rapid pressure build-up of the hydraulic fluid locked in the die by the closed valves 36, 25 and 51. As the press continues its downward stroke, the pressure builds up rapidly to the set maximum pressure, such as the 5000 lbs. per square inch indicated earlier. At this point the pressure regulating valve 67 opens and then the relief valve 35 opens. From this point on, further downward movement of the press results in forcing hydraulic fluid rapidly through the relief valve in large volumes. This flow path is indicated diagrammatically in Fig. 8.

As soon as the press has reached its maximum downward stroke, it initiates its return movement. This immediately relieves the pressure on the hydraulic elements within the die, producing a pressure drop on the demand side of the valve assembly. Since the pressure was maintained at the tripping pressure of the pressure regulating valve 51, this valve closes immediately and further upward movement of the press causes the pressure in the die on the demand side to fall below the pressure in the supply conduit 14. The hydraulic forces acting on the relief valve 35 rapidly approach a balance, permitting the spring 39 to again bias this valve closed. It is obvious that a press operating at 200 strokes per minute will require a valve capable of passing large quantities of hydraulic fluid.

As a result of the inability of known valves to service the die rapidly with sufficient volumes of hydraulic fluid, the maximum efficiency of dies of this type could not be utilized. It is necessary to reduce the operating speed of the press to give the valves sufficient time to pass the necessary quantities of fluid. Even small dies of this type will require as much as 116 cubic inches of hydraulic fluid per cycle. This valve is intended to operate with presses having as much as 200 cycles per minute. Such a press necessitates the flow of 23,200 cubic inches of hydraulic fluid in each direction per minute. Where the dies are of substantial size, the quantities required greatly exceed this value. Further, by permitting the oil to return quite freely to the die, the frictional heat generated in the valve is substantially reduced. This is important because the heat problem in an operation of this type becomes serious due to the rapid repeated build-up of pressures on the hydraulic fluid in the die. Further, the valve must be so built that it may operate effectively at this high speed without mechanical failure due to wear, chatter or vibration.

While a preferred embodiment of this invention has been described, it will be recognized that various modifications of this value structure can be made each incorporating the principle of this invention. Each of these modifications is to be considered as included in the hereinafter appended claims unless these claims by their langauge expressly state otherwise.

We claim:

1. In a hydraulic valve having a housing, said housing having a supply passage adapted to receive fluid from a source under pressure and a receiving passage adapted to be connected to a fluid demand zone of fluctuating pressure, the combination comprising: a first valve chamber communicating with both of said passages; a relief valve in said first valve chamber and resilient means biasing said relief valve closed, said relief valve when closed being adapted to shut off communication between said passages through said first valve chamber; a pressure chamber communicating with the end of said relief valve remote from said passages; the surface area of said relief valve exposed to said pressure chamber being larger than the surface area of said relief valve exposed to said receiving passage; first conduit means communicating with said receiving passage and said pressure chamber; a flow restrictor element in said first conduit means; a pressure regulating valve chamber having a receiving port and a discharge port and a pressure regulating valve therebetween; resilient means biasing said pressure regulating means closed; a plunger having one end bearing against said pressure regulating valve; a second conduit means providing communication between said pressure chamber and said receiving port of said pressure regulating valve chamber; a third conduit means providing communication between said discharge port and said fluid source; said pressure regulating valve, second and third conduit means each having a flow capacity substantially greater than the flow capacity of said restrictor means whereby when said pressure regulating valve is open fluid will discharge from said pressure chamber and said relief valve will open under the urging of fluid in said receiving passage; a second valve chamber communicating with both said supply and receiving passages; a check valve in said second valve chamber, said check valve when closed being adapted to isolate said passages from each other; resilient means of lesser thrust than the resilient means biasing said relief valve, adapted to bias said check valve closed; said check valve being adapted to open when the fluid pressure in said supply passage exceeds the fluid pressure in said receiving passage.

2. In a hydraulic valve, a housing having three valve chambers, the combination comprising: a check valve in the first of said valve chambers; a relief valve in the second of said valve chambers, a pressure regulating valve in the third of said chambers; a supply passage and a receiving passage each communicating with both said first and second valve chambers; said check and relief valves when closed being adapted to isolate said receiving passage from said supply passage; resilient means biasing each of said valves closed; said second valve chamber having a front portion and a rear portion, said front portion being in communication with said receiving passage; said relief valve having a greater area exposed at said rear portion than at said front portion said third chamber having first and second portions, said pressure regulating valve being adapted when closed to isolate said first and second portions from each other; resilient means biasing said pressure regulating valve closed; first conduit means providing communication between said receiving passage and said first portion; second conduit means providing communication between said first portion and said rear portion of said second valve chamber; a flow restrictor in said first portion between said first and second conduit means; a third conduit means communicating with said second portion and said supply passage; said second and third conduit means having a flow capacity greater than said restrictor element whereby fluid will flow therethrough from the rear portion of said second valve chamber when said pressure regulating valve is open and said relief valve will open under the urging of fluid in said receiving passage.

References Cited in the file of this patent

UNITED STATES PATENTS

| | | |
|---|---|---|
| 1,583,834 | Humphrey | May 11, 1926 |
| 1,757,738 | Rode | May 6, 1930 |
| 2,564,922 | Patten | Aug. 21, 1951 |
| 2,604,327 | Kerkham | July 22, 1952 |
| 2,619,111 | Renick | Nov. 25, 1952 |
| 2,642,887 | Renick | June 23, 1953 |
| 2,661,763 | Renick | Dec. 8, 1953 |
| 2,732,851 | Ashley | Jan. 31, 1956 |